US005477267A

United States Patent [19]

Kim

[11] Patent Number: 5,477,267

[45] Date of Patent: Dec. 19, 1995

[54] APPARATUS FOR HOLDING A RECEIVER SHEET IN A VIDEO PRINTER

[75] Inventor: Jong-Woo Kim, Suwon, Rep. of Korea

[73] Assignee: Samsung Electronics Co., Ltd., Kyungki-do, Rep. of Korea

[21] Appl. No.: 961,848

[22] Filed: Oct. 16, 1992

[30] Foreign Application Priority Data

Oct. 16, 1991 [KR] Rep. of Korea .................. 18179/1991

[51] Int. Cl.$^{6}$ ...................................................... G01D 15/10

[52] U.S. Cl. .......................... 347/215; 347/216; 347/217; 347/218; 347/197; 355/309; 271/277

[58] Field of Search ............................... 346/76 PH, 138; 271/277; 355/309; 347/215, 216, 217, 218, 219, 220, 197

[56] References Cited

U.S. PATENT DOCUMENTS 4,909,645 3/1990 Sudo et al. ...................... 346/76 PH X
5,168,287 12/1992 Okunomiya et al. ............... 346/76 PH

*Primary Examiner*—Peter S. Wong
*Assistant Examiner*—Randy W. Gibson
*Attorney, Agent, or Firm*—Sughrue, Mion, Zinn, Macpeak & Seas

[57] ABSTRACT

A color video printer for producing a full-colored image on a dye-absorbing receiver sheet by thermally transferring three different colored dyes of Y, M and C applied to a ribbon in response to video signals. The printer includes a supply guide chute (102) for supplying the receiver sheet, a discharge guide chute (104) for discharging the receiver sheet, a platen drum (20) rotatable in a single direction, a pair of holder members (60) respectively mounted on both ends of the platen drum, a pair of holders (61) respectively attached to the pair of holder members for clamping the leading end of the receiver sheet to the peripheral surface of the platen drum, a head member (40) having a first cam follower at one end and a thermal print head at the other end, a pair of link structures (50, 70, 80 and 90) with a second cam follower for operating the pair of holder members so as to cause the pair of holders to temporarily protrude from the peripheral surface of the platen drum to hold the leading end of the receiver sheet, and a cam gear (30) with a first cam groove engaged by the second cam follower of the pair of link structures.

8 Claims, 6 Drawing Sheets

APPARATUS FOR HOLDING A RECEIVER SHEET IN A VIDEO PRINTER

BACKGROUND OF THE INVENTION

1. Field of the Invention

The present invention relates to a video printer and more particularly to an apparatus for holding a receiver sheet in a video printer.

2. Background

Generally the video printer is designed to produce a full-colored image on a dye-absorbing receiver sheet by thermally transferring three different colored dyes, including yellow (Y), magenta (M) and cyan (C), in response to video signals. Namely, as shown in FIG. 1, the three different colored dyes of Y, M and C sequentially disposed on a ribbon 1 are heated by thermal print head 4 and transferred to the receiver sheet 3 fixedly supported on a platen drum 2 and rotated therewith.

An apparatus for holding the receiver sheet to the platen drum is disclosed in U.S. Pat. No. 4,815,870, as shown in FIG. 2. In this device, when the receiver sheet 3 is supplied through a supply guide chute 'A', a bracket 7 is pivoted clockwise about a pivot 7*b* along the exterior camming surface of a first cam 5*a*, so that an urging portion 7*c* of the bracket 7 urges contact portion 6*a* of a clamp 6 counter-clockwise. As a result, spring 9 is expanded and the clamp 8 moved beyond the peripheral surface of the platen drum 2 so as to receive the receiver sheet 3. Subsequently, when the cam follower 7*a* of the bracket 7 moves over the camming surface of the cam 5*a* and the urging portion 7*c* of the bracket 7 no longer applies a force to the contact portion 6*a* of the clamp 6, the resilient force of the spring 9 causes the clamp 6 to be rotated clockwise so as to clamp the receiver sheet 3 against the platen drum 2.

When the receiver sheet 3 is discharged through the discharge guide chute 'b' after completion of the printing, the platen drum 2 is rotated in the direction opposite to that of printing. As a result, the clamp 8 is displaced from the peripheral surface of the platen drum 2 to release the receiver sheet 3 as the bracket 7 moves along the exterior surface of the second cam 5*b*.

With such a conventional printer the supply guide chute 'A' and discharge guide chute 'B' are separated by the platen drum 2, as shown in FIG. 2. As a result, the overall size of the printer is relatively large. In addition, in order to discharge the receiver sheet it is necessary that the platen drum be rotated in the direction opposite to the printing direction. Moreover, all three of the different colored dyes must be transferred to the receiver sheet before reversing the platen drum 2 in order to discharge the receiver sheet, thus increasing the printing time.

SUMMARY OF THE INVENTION

It is an object of the present invention to provide a color video printer wherein the platen drum is rotated only in one direction during supplying, discharging and printing the receiver sheet.

It is another object of the present invention to provide a color video printer wherein the three different colored dyes of Y, M, C are sequentially and individually transferred to the receiver sheet for each rotation of the platen drum with the final third dye being transferred during discharge of the receiver sheet.

It is a further object of the present invention to provide a color video printer wherein the thermal print head and receiver sheet holding means are moved by the same cam means.

According to the present invention, there is provided a color video printer for producing a full-colored image on a dye-absorbing receiver sheet by thermally transferring three different colored dyes of Y, M and C applied to a ribbon in response to video signals, which comprises a supply guide chute for supplying the receiver sheet, a discharge guide chute for discharging the receiver sheet; a platen drum with opposite ends having a central shaft extending therefrom and made so as to rotate only in one direction, the receiver sheet being fixedly supported upon the peripheral surface of the platen drum; a pair of holder members respectively mounted on both ends of the platen drum so as to be pivotally moved about the central shafts; a pair of holders each attached to the pair of holder members for clamping the leading end of the receiver sheet to the peripheral surface of the platen drum; a head member having a first cam follower at one end and a thermal print head at the other end for thermally transferring the dyes of the ribbon to the receiver sheet; a pair of link structures with a second cam follower for operating the pair of holder members so as to cause the pair of holders to temporarily protrude from the peripheral surface of the platen drum to hold the leading end of the receiver sheet; and a cam gear with a first cam groove engaged by the first cam follower of the head member and a second cam groove engaged by the second cam follower of the pair of link structures, wherein the pair of holder members are resiliently supported by means of a pair of springs so as to cause the pair of holders to normally press the peripheral surface of the platen drum near the both ends thereof. The pair of link structures are designed to temporarily push the pair of holder members by rotating the cam gear, so that, when starting the supply of the receiver sheet, the pair of holders may protrude from the peripheral surface of the platen drum to hold and clamp the leading end of the receiver sheet against the peripheral surface, and when the platen drum starts a third rotation for the last third dye to be transferred to the receiver sheet to which two of the three different colored dyes of Y, M and C have been sequentially and individually transferred for each rotation of the platen drum, the leading end of the receiver sheet is released from the pair of holders so as to move towards the discharge guide chute.

In a preferred embodiment of the present invention, the pair of link structures comprise a pair of sliders each with a guide slot for moving in a linear manner, the guide slot having a sloped portion and horizontal portion; a first lever with the second cam follower for moving the pair of sliders forwards and backwards within a given limit according to the rotation of the cam gear; a pair of second levers each with a hinge at one end and a guide pin at the other end thereof, the pair of second levers being pivoted on the hinges; and a pair of third levers for pushing the pair of holder members by pivotal movement so as to cause the pair of holders to protrude from the peripheral surface of the platen drum, the pair of third levers being pivoted by the second pair of levers when the pair of sliders move to the forward limit by pivotal movement of the first lever.

The present invention will now be described more specifically with reference to the drawings attached only by way of example.

DETAILED DESCRIPTION OF THE PREFERRED EMBODIMENT

Figure 1:
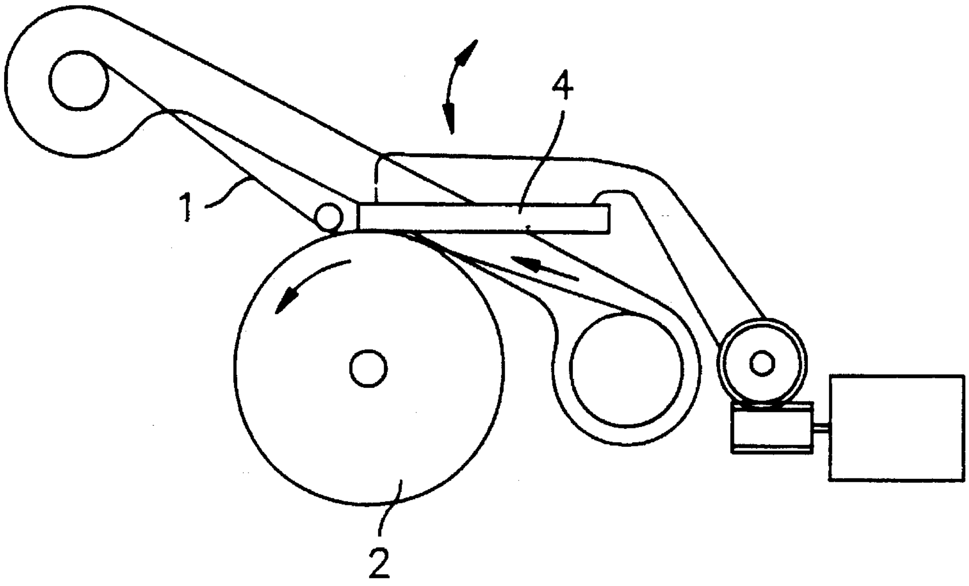
FIG. 1 PRIOR ART
FIG. 1 is a schematic illustration of a conventional video printer.
Figure 2:
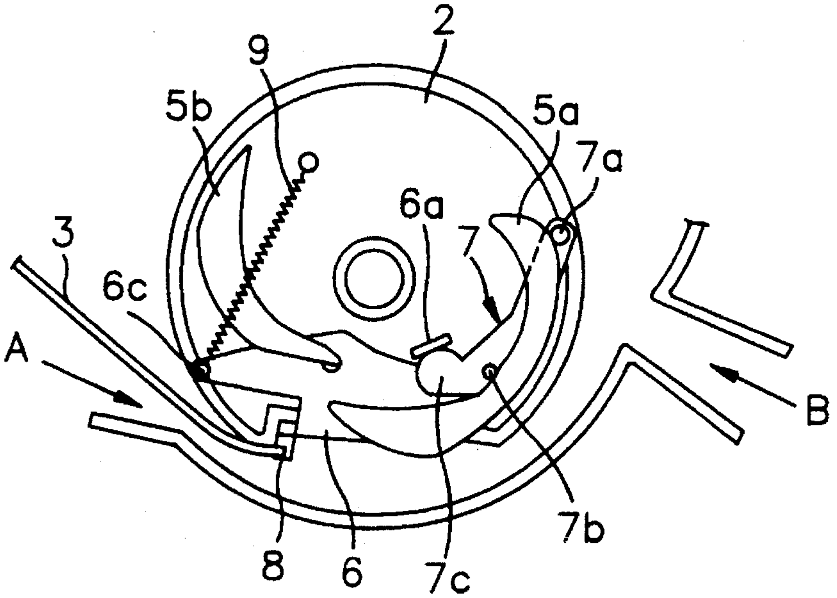
FIG. 2 PRIOR ART
FIG. 2 is a schematic illustration of a conventional means for holding receiver sheets used in a video printer.
Figure 3:
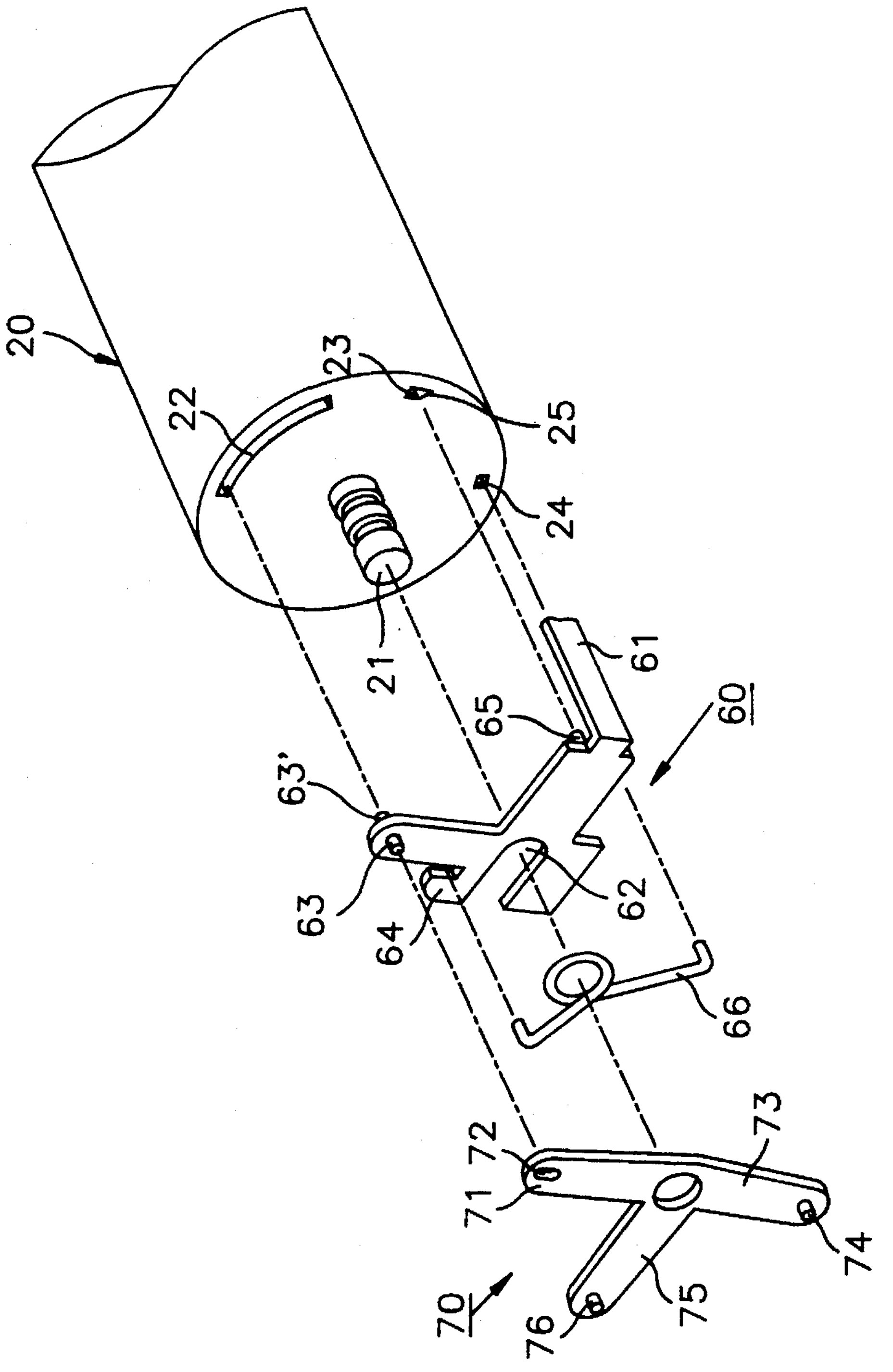
FIG. 3 is an exploded view illustrating the levers and holder members of the receiver sheet holding apparatus mounted on the ends of the platen drum in a video printer according to an embodiment of the present invention.

Referring to FIGS. 4A–4H, the apparatus for holding receiver sheets used in a video printer according to the present invention comprises cam gear 30, first lever 80, slider 50, second lever 90, third lever 70 and holder member 60. The holder member 60 and third lever 70 are successively mounted on the ends of the platen drum 20 so that the motion of the third lever is transmitted to the holder member, as also illustrated in FIG. 3.

A receiver sheet 100 is supplied via supply guide chute 102 to the platen drum 20 and discharged via discharge guide chute 104. The platen drum 20 has two ends each with a central shaft 21 extending therefrom and a peripheral surface for fixedly supporting the receiver sheet, and is so arranged as to be rotated in a single direction. The holder member 60 is pivotally mounted on each central shaft 21 extending from the opposite ends of the platen drum and has a holder 61 for clamping the leading end of the receiver sheet to the peripheral surface of the platen drum, as described in greater detail below.

The head member 40 includes a first cam follower 41 and a thermal print head 40*a* for thermally transferring the three different colored dyes of Y, M, C, which are sequentially applied to a ribbon, to the receiver sheet. The cam gear 30 comprises first and second arcuate cam grooves 31 and 32. The rotational motion of the cam gear 30 on the one hand, is transferred via the first cam follower and first cam groove 31 to the head member 40, and on the other hand, via second cam follower 82 and second cam groove 32 to a link structure (discussed below) and attendantly to the holder member 60.

The link structure comprises the first lever 80 with the second cam follower 82 disposed at one end thereof, slider 50 connected with the other end of the first lever 80 by means of an operational pin 83, second lever 90 connected to the slider by means of a hinge 91, and third lever 70 for receiving the motion of the second lever. The first lever 80 is so arranged as to pivot about a pivot pin 81 as the second cam follower 82 moves along the second cam groove 32. Pivotal movement of the first lever 80 causes the operational pin 83 to urge the slider 50 in forward and backward directions. The other end of the slider 50 has an elongate guide slot 51 comprising a horizontal and a sloped portion. At one end of the second lever 90 there is formed a guide pin 92 which is slidably disposed in the guide slot 51 to control the pivotal movement of the guide pin, as described in more detail below. The third lever 70 is substantially T-shaped including three arms 71, 73, 75 extending from a common base having a hole for rotatably receiving the central shaft 21 of the platen drum. Among the three arms, the adjacent first and second arms 73 and 75 respectively have first and second operational pins 74 and 76 at the ends opposite to the common base, and the remaining third arm 71 has an elongated holder member engaging opening 72 at the end opposite to the common base.

As shown in FIG. 3, the holder member 60 is substantially L-shaped including two arms. A first arm includes a base portion having an elongate opening 62 for receiving the central shaft 21 and a holder 61 extending perpendicular to the end opposite to the base. As described below, the holder 61 is alternatively supported on or displaced from the peripheral surface of the platen drum. The holder member 60 is resiliently supported by spring 66 so as to cause the holder 61 to normally press against the peripheral surface of the platen drum near the opposite ends thereof. The second arm has two guide pins 63, 63' extending from opposite sides thereof, and the first arm has a holder guide pin 65 at the rear side thereof near the holder 61. Each end of the drum has a relatively long first arcuate groove 22 for receiving and guiding the rear guide pin 63' of the second arm and a relatively short second guide groove 23 for receiving the holder guide pin 65. The second guide grooves 23 have a sloped guide surface 25 inclined toward the outer circumferential portion of the drum so that the holders 61 may protrude from the peripheral surface of the platen drum when the holder guide pins 65 are guided so as to rotate in the clockwise direction.

The holder members 60 and third levers 70 are respectively successively mounted on opposite ends of the platen drum 20 so as to rotate about the central shafts 21. The elements are arranged such that the third arm of each third lever 71 overlaps the second arm of the holder member 60 and the first arm of the holder member, with the holder 61 extending therefrom, is positioned opposite to the second arm 75 of each of the third levers and between the first and third arms 73 and 71 of the third levers, as best illustrated in FIG. 3. In this case, the front guide pin 63 of the second arm of the holder member is movably received by the holder member engaging opening 72 of the third lever 70, thus connecting the third lever 70 to the holder member 60. The end of the second lever 90 with the guide pin 92 is designed to push against the first or second operational pin 74 or 76 in order to rotate the third lever clockwise, as discussed further below.

The discharge and supply guide chutes 104 and 102 are vertically arranged on one side of the platen drum 20. In this case, the second lever 90 is so arranged as to push the first or second operational pin 74 or 76 of the third lever depending upon whether the holder 61 of the holder member 60 faces the supply guide chute 102 or the discharge guide chute 104. The first cam groove 31 of the cam gear 30 is shaped so that the print head of the head member 40 may contact the receiver sheet supported on the platen drum during printing, while the second cam groove 32 is shaped so that the first lever 80 may be operated so as to cause the holder 61 of the holder member 60 to protrude from the peripheral surface of the platen drum when supplying or discharging the receiver sheet.

Figure 4A:
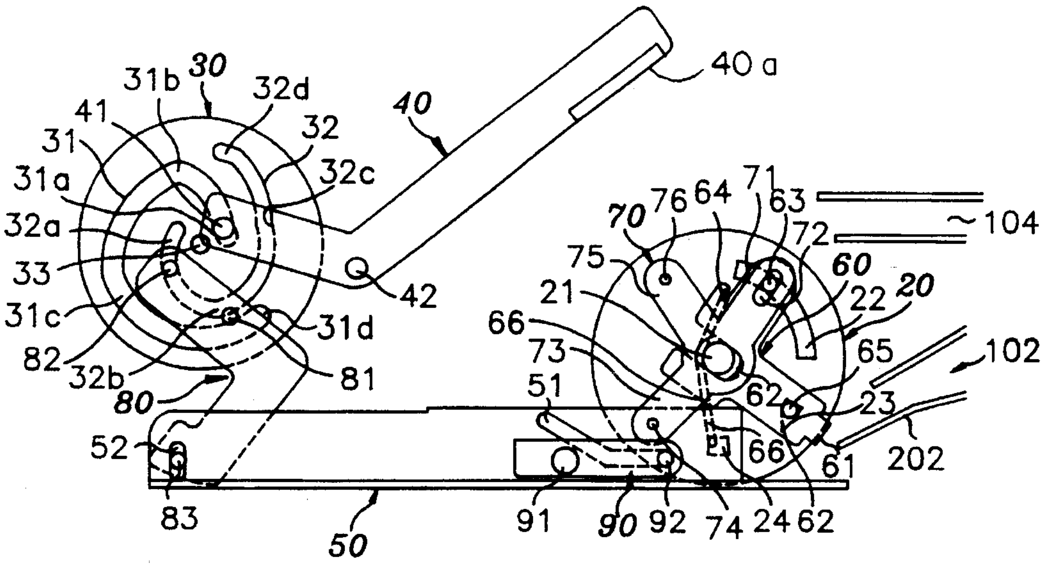
FIGS. 4A–4H are schematic illustrations of the overall structure of the receiver sheet holding apparatus and the operational relationship between the essential parts thereof in the inventive video printer.
Figure 4B:
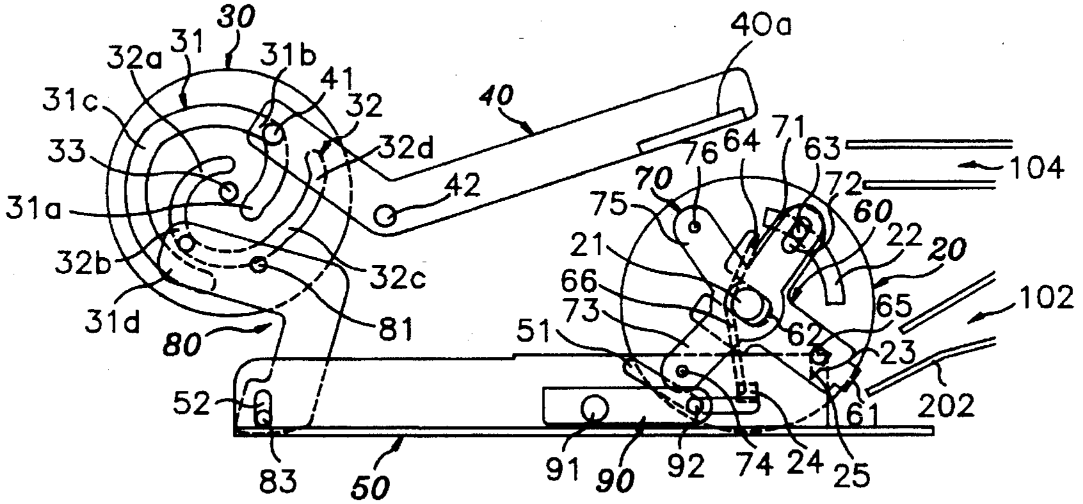
Figure 4C:
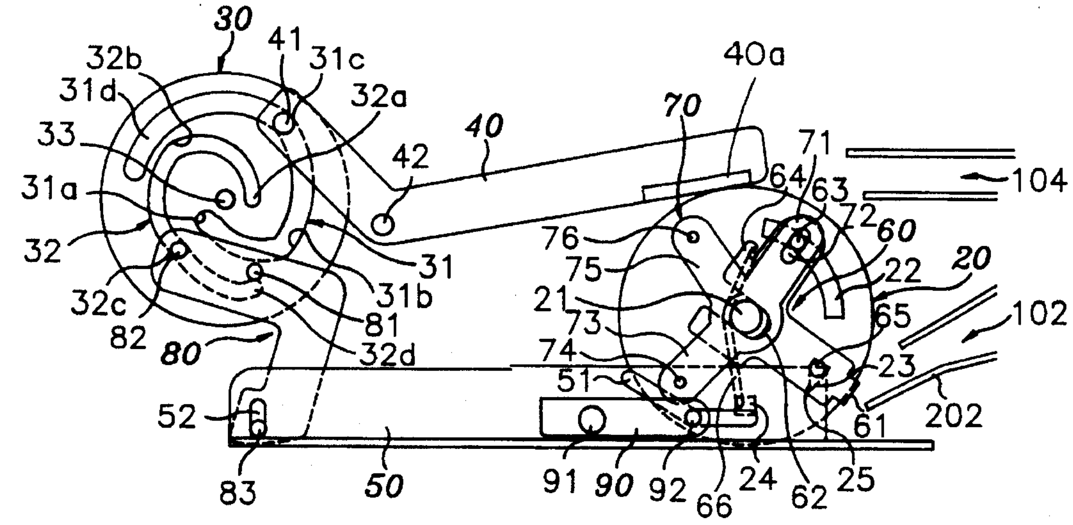
Figure 4D:
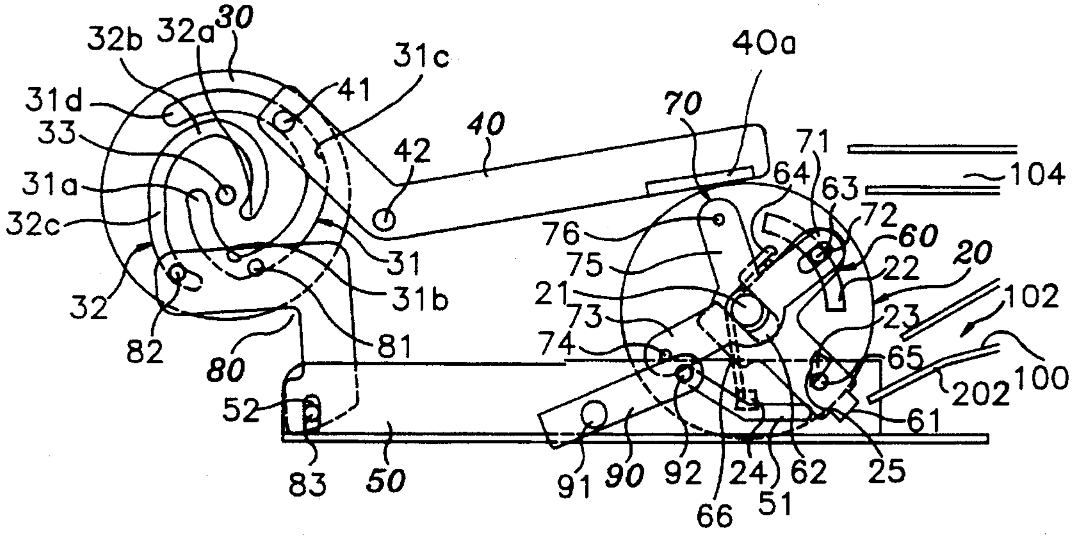

In the printing operation, if the cam gear 30 is rotated clockwise as shown in FIGS. 4A–4D, the first cam follower 41 of the head member 40 is guided from the starting position 31*a* (see FIG. 4A) of the first cam groove 31 through the intermediate positions 31*b*, 31*c* (see FIGS. 4B and 4C) to the final position as shown in FIG. 4D, thereby making the print head contact the peripheral surface of the platen drum 20. On the other hand, the second cam follower 82 of the first lever 80 is guided from the starting position 31*a* of the second cam groove 32 (see FIG. 4A) through the intermediate positions 32*b*, 32*c* (see FIGS. 4B–4C) to the final position 32*d* as shown in FIG. 4D, thereby pushing the slider 50 to the right in the Figures so as to pivot the second lever 90 counterclockwise about the hinge 91. As a result, the guide pin 92 is guided backwards (to the left) along the guide slot 51 moving upwards along the sloped portion thereof, so that the guide pin 92 of the second lever 90 pushes the first operational pin 74 of the first arm 73 of the third lever 70, thereby rotating the third lever clockwise. Accordingly, the third arm 71 moves clockwise so as to rotate the holder member 60, connected thereto via the front guide pin 63, clockwise with the rear pin 63' disposed in the first guide groove 22 formed in the ends of the platen drum 20. Consequently, the holder member 60 pivots about the central shaft 21 of the platen drum against the bias of the spring and thus the holder guide pin 65 slides down along the sloped guide surface 25 of the second guide groove 23 formed in the end of the platen drum, so that the holder 61 is displaced from the peripheral surface of the platen drum so as to receive the leading end of the receiver sheet between the holder 61 and the peripheral surface of the drum.

Figure 4E:
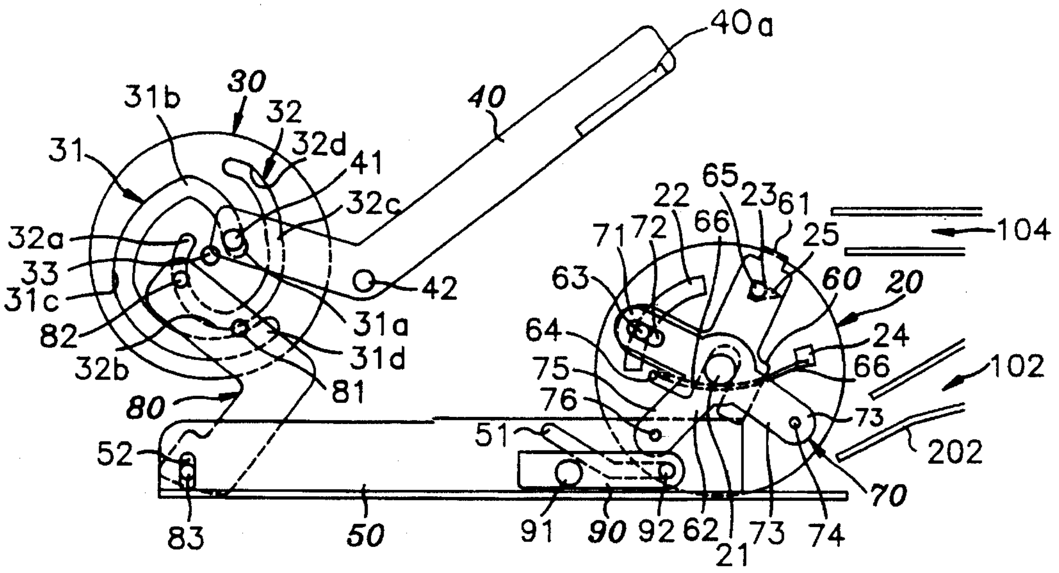
Figure 4F:
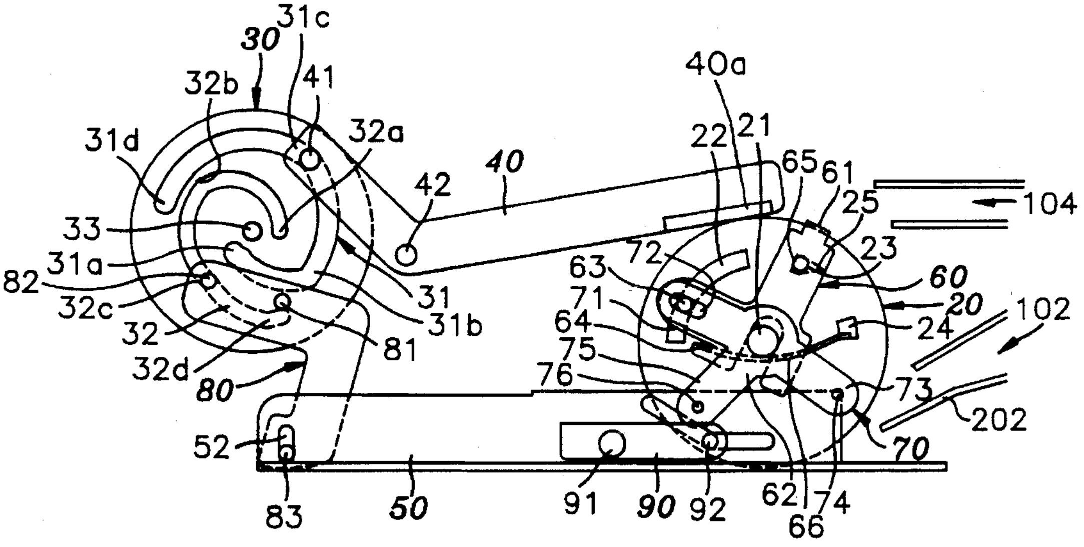

Thereafter, the cam gear 30 is rotated counterclockwise so as to return the second cam follower 82 to the starting position 32*a* of the second cam groove 32, which in turn causes the slider 50 to return to the original position, thus rotating the second lever 90 clockwise so as to return to the horizontal position. Meanwhile, the holder member 60 is retracted to the original position by the bias of the spring 66, so that the holder 61 clamps the leading end of the receiver sheet against the peripheral surface of the platen drum. In addition, the first cam follower 41 is guided to the starting position 31*a* of the first cam groove 31 and thus the head member 40 is raised away from the peripheral surface of the platen drum, while the platen drum is rotated clockwise until the holder 61 clamping the leading end of the receiver sheet opposes the inlet of the discharge guide chute 104, as shown in FIG. 4E. Subsequently, the cam gear 30 is again rotated clockwise so as to cause the print head of the head member 40 to descend to press the receiver sheet against the peripheral surface of the platen drum, as shown in FIG. 4F. In this case, the curved surface of the second cam groove is so shaped that the movement of the slider 50 does not raise the second lever 90 from the drum.

Figure 4G:
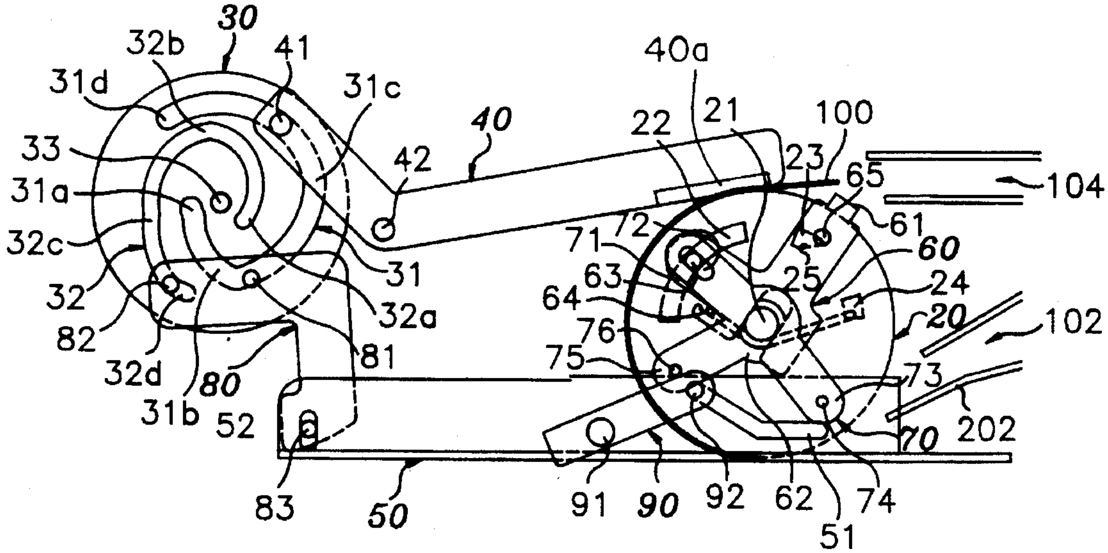
Figure 4H:
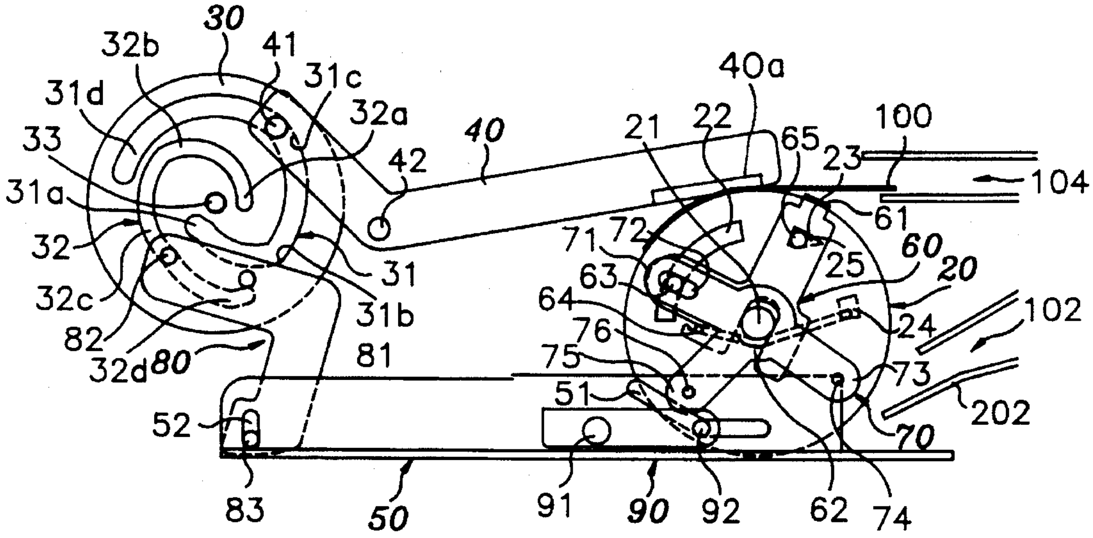

In this state, the platen drum 20 is rotated clockwise twice to sequentially and individually transfer two (Y and M) of the three different colored dyes to the receiver sheet upon each rotation. Thereafter, when the platen drum starts a third rotation for the last third dye (C) to be transferred to the receiver sheet, the cam gear 30 is again rotated clockwise so as to rotate the third lever in the same manner as when supplying the receiver sheet, thus causing the holder 61 of the holder member 60 to be displaced from the peripheral surface of the platen drum. In this case, the guide pin 92 of the second lever 90 pushes the second operational pin 76 of the second arm of the third lever 70. Accordingly, the leading end of the receiver sheet, as shown in FIG. 4G, is released from the peripheral surface of the platen drum by its self-resiliency so as to move towards the discharge guide chute 104, while the cam gear 30 is rotated counterclockwise so as to return the second lever to the horizontal position. Subsequently, as shown in FIG. 4H, the platen drum is rotated clockwise to transfer the last third dye (C) to the receiver sheet while discharging the receiver sheet through the discharge guide chute 104. In this case, the curved surface of the first cam groove 31 is so shaped as to maintain the contact between the print head of the head member 40 and the peripheral surface of the platen drum.

It should be understood that many modifications and adaptations of the invention will become apparent to those skilled in the art and it is intended to encompass such modifications in the scope of the claims appended hereto.

What is claimed is:

1. A color video printer for producing a full colored image on a dye-absorbing receiver sheet by thermally transferring three different colored dyes applied to a ribbon in response to video signals, comprising:

a supply means (102) for supplying said receiver sheet;

a discharge means (104) for discharging said receiver sheet;

a platen drum (20) with two ends having central shafts (21) and made so as to rotate only in one direction, said receiver sheet being fixedly supported upon the peripheral surface of said platen drum;

a pair of holder members (60) respectively mounted on both ends of said platen drum so as to be pivotally moved about said central shafts (21);

a pair of holders (61) each attached to said pair of holder members (60) for clamping the leading end of said receiver sheet to the peripheral surface of said platen drum;

a head member (40) having a first cam follower (41) at one end and a thermal print head at the other end for thermally transferring said dyes of said ribbon to said receiver sheet;

a pair of link structures (50, 70, 80, 90) with a second cam follower (82) for operating said pair of holder members (60) so as to cause said pair of holders (61) to temporarily protrude from the peripheral surface of said platen drum to receive said leading end of said receiver sheet; and a cam gear (30) with a first cam groove (31) engaged by said first cam follower (41) of said head member and a second groove (32) engagedly said second cam follower (82) of said pair of link structures for respectively actuating said head member and said holder members, wherein said pair of holder members (60) are resiliently supported by means of a pair of springs (66) so as to cause said pair of holders (61) to normally press said peripheral surface of said platen drum near said both ends thereof, said pair of link structures (50, 70, 80, 90) are so made as to temporarily push said pair of holder members (60) by rotating said cam gear (30), so that, when starting supply of said receiver sheet, said pair of holders (61) protrude from said peripheral surface of said platen drum to hold and clamp said leading end of said receiver sheet to said peripheral surface, and when said platen drum starts a third rotation for the last third dye to be transferred to said receiver sheet to which two of said three different colored dyes of Y, M and C have been sequentially transferred one by one at each rotation of said platen drum, said leading end of said receiver sheet is released from said pair of holders (61) so as to move towards said discharge means (104), and further wherein said pair of link structures comprise a pair of sliders (50) each with a guide slot (51) for making a straight motion, said guide slot having a sloped portion and horizontal portion, first lever (80) with said second cam follower (82) for moving said pair of sliders (50) forwards and backwards within a given limit according to the rotation of said cam gear (30), a pair of second levers (90) each with a hinge (91) at one end and a guide pin (92) at the other end thereof, said pair of second levers being pivoted on said hinges, and a pair of third levers (70) for pushing said pair of holder members (60) by pivotal movement so as to cause said pair of holders (61) to protrude from said peripheral surface of said platen drum (20), said pair of third levers being pivoted by said second pair of levers when said pair of sliders move to the forward limit by pivotal movement of said first lever.

2. A color video printer for producing a full colored image on a dye-absorbing receiver sheet by thermally transferring three different colored dyes applied to a ribbon in response to video signals, comprising:

a supply means (102) for supplying said receiver sheet;

a discharge means (104) for discharging said receiver sheet;

a platen drum (20) with two ends having central shafts (21) and made so as to rotate only on one direction, said receiver sheet being fixedly supported upon the peripheral surface of said platen drum;

a pair of holder members (60) respectively mounted on both ends of said platen drum so as to be pivotally moved about said central shafts (21);

a pair of holders (61) each attached to said pair of holder members (60) for clamping the leading end of said receiver sheet to the peripheral surface of said platen drum;

a head member (40) having a first cam follower (41) at one end and a thermal print head at the other end for thermally transferring said dyes of said ribbon to said receiver sheet;

a pair of link structures (50, 70, 80, 90) with a second cam follower (82) for operating said pair of holder members (60) so as to cause said pair of holders (61) to temporarily protrude from the peripheral surface of said platen drum to receive said leading end of said receiver sheet; and a cam gear (30) with a first cam groove (31) engaged by said first cam follower (41) of said head member and a second cam groove (32) engaged by said second cam follower (82) of said pair of link structures for respectively actuating said head member and said holder members, wherein said pair of holder members (60) are resiliently supported by means of a pair of springs (66) so as to cause said pair of holders (61) to normally press said peripheral surface of said platen drum near said both ends thereof, said pair of link structures (50, 70, 80, 90) are so made as to temporarily push said pair of holder members (60) by rotating said cam gear (30), so that, when starting supply of said receiver sheet, said pair of holders (61) protrude from said peripheral surface of said platen drum to hold and clamp said leading end of said receiver sheet to said peripheral surface, and when said platen drum starts a third rotation for the last third dye to be transferred to said receiver sheet to which two of said three different colored dyes of Y, M and C have been sequentially transferred one by one at each rotation of said platen drum, said leading end of said receiver sheet is released from said pair of holders (61) so as to move towards said discharge means (104), and further wherein said pair of holder members (60) are substantially L-shaped with two branches, one of said two branches having at the base an elongated opening (62) for receiving one of said central shafts (21) and one of said pair of holders (61) being perpendicular to the end opposite to said base, said pair of holders (61) being supported on or protruding from said peripheral surface of said platen drum as said pair of holder members (60) move along said elongated openings (62) about said central shafts (21).

3. A color video printer as defined in claim 2, wherein the other of said two branches has two guide pins (63, 63') at opposite sides, said one branch also has a holder guide pin (65) at the rear side thereof near said holder (61), and the end of said platen drum have relatively long first arcuate grooves (22) for guiding the rear guide pin (63') of said other branch and relatively short second guide grooves (23) for guiding said holder guide pin (65) when mounting said pair of holder members on said central shafts (21), said second guide grooves (23) having a sloped guide surface (24) outwardly inclined so that said pair of holders (61) may protrude from said peripheral surface of said platen drum when said holder guide pins (65) are guided clockwise.

4. A color video printer as defined in claim 3, wherein said pair of third levers (70) are substantially T-shaped with three branches (71, 73, 75), the common base of said three branches having a circular opening for rotatably receiving said central shafts (21) of said platen drum, two adjacent first and second branches (73 and 75) of said three branches respectively having a first and second operational pins (74 and 76) at the ends opposite to said common base, the remaining branch (71) having at the end opposite to said common base a holder member engaging opening (72) for movably receiving the front guide pin (63) of said other branch of said pair of holder members so that the operation of said pair of third levers (70) is linked to said pair of holder members (60) via said holder member engaging opening (72) and front guide pin (63).

5. A color video printer as defined in claim 4, wherein said pairs of holder members (60) and third levers (70) are successively mounted on both ends of said platen drum (20) about said central shafts (21), said third branches (71) overlaps said other branches of said pair of holder members (60), and the branches of said pair of holder members with said holders (61) are positioned opposite to the second branches (75) of said pair of third levers around the first and third branches of said pair of third levers.

6. A color video printer as defined in claim 4, wherein said pair of second levers (90) are so arranged that, as said pairs of sliders (50) move to said forward limit, said guide pins (92) thereof may be guided along said slope portion of said elongated guide groove (51) so as to cause the ends of said pair of second levers with said guide pins (92) to push said first or second operation pins (74 or 76) of said pair of third levers (70), whereby said pair of third levers are rotated clockwise to push said pair of holder members (60) causing said holders (61) to protrude from said peripheral surface of said platen drum (20).

7. A color video printer as defined in claim 6, wherein said pair of second levers (90) are so arranged as to push said first or second operational pins (74 or 76) of said pair of third levers according to whether said holders (61) of said pair of holder members (60) face said supply means (102) or discharge means (104).

8. A color video printer as defined in claim 7, wherein said discharge and supply means (104 and 102) are vertically arranged on one side of said platen drum.

* * * * *